Jan. 2, 1934.   A. D. MacLEAN   1,941,701
DYNAMIC FLOW CONTROL METHOD AND APPARATUS
Filed June 18, 1928   2 Sheets-Sheet 1
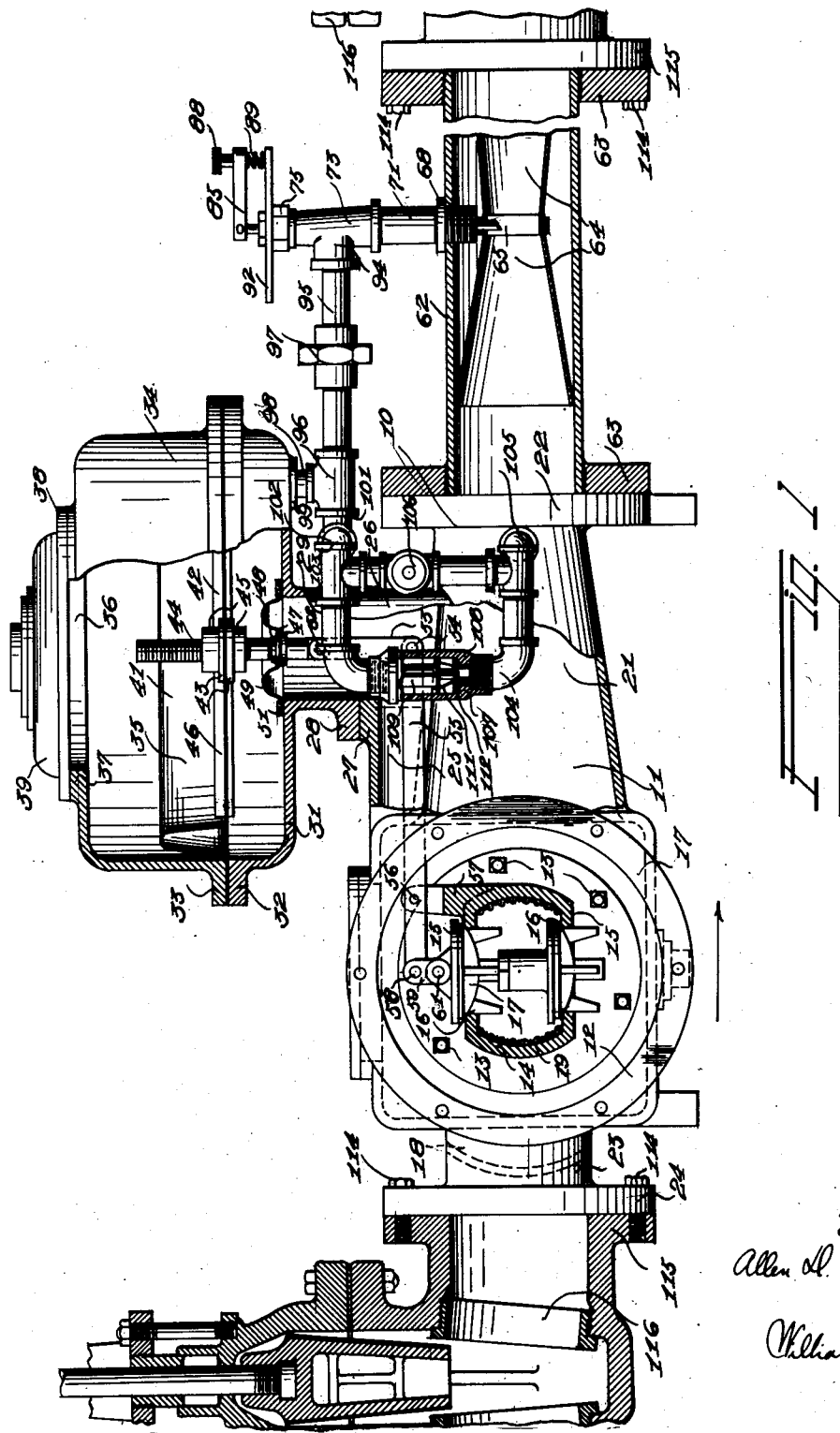
Inventor
Allen D. McLean
William A. Strauch
Attorney Jan. 2, 1934.  A. D. MacLEAN  1,941,701
DYNAMIC FLOW CONTROL METHOD AND APPARATUS
Filed June 18, 1928  2 Sheets-Sheet 2
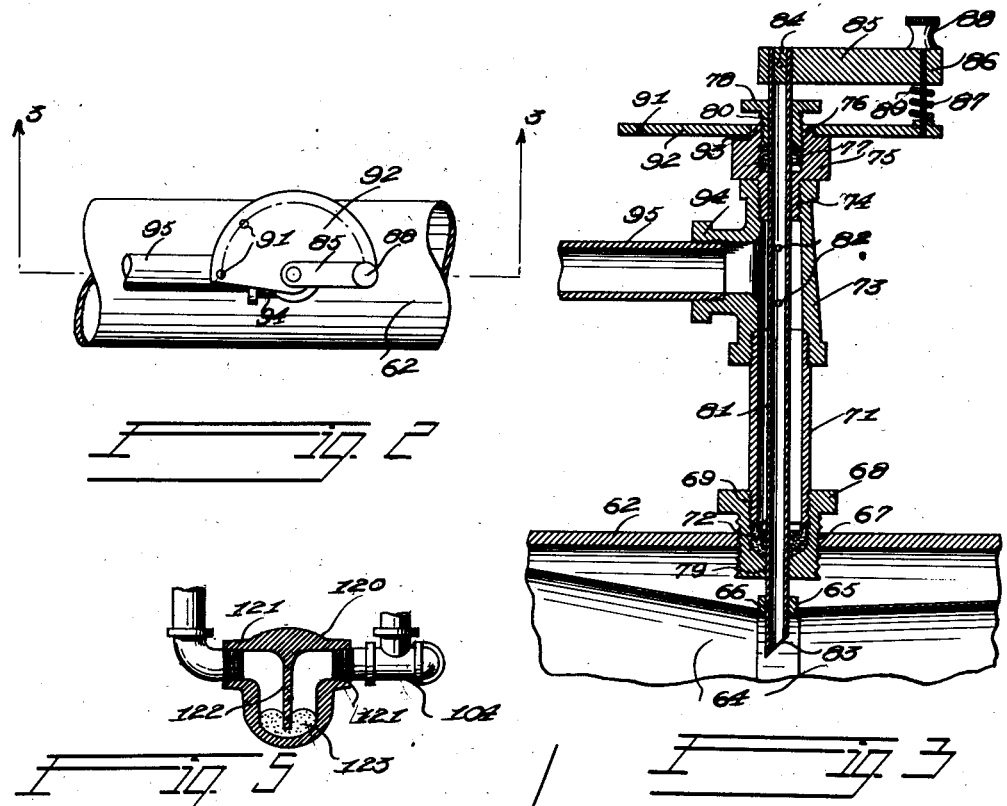
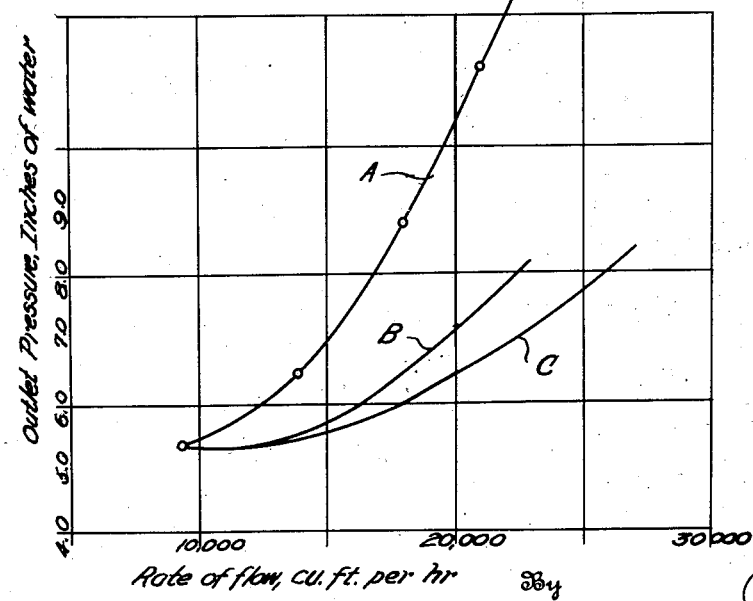

Patented Jan. 2, 1934

1,941,701

UNITED STATES PATENT OFFICE 1,941,701

DYNAMIC FLOW CONTROL METHOD AND APPARATUS

Allen D. MacLean, Pittsburgh, Pa., assignor to Pittsburgh Equitable Meter Company, Pittsburgh, Pa., a corporation of Pennsylvania Application June 18, 1928. Serial No. 286,447

15 Claims. (Cl. 50—16)

The present invention relates to dynamic flow control systems and apparatus, and more particularly the invention relates to novel dynamic controls for fluid regulators to automatically vary the fluid pressures in a fluid supply system in accordance with the variations of fluid flow.

As is well understood by those skilled in the art it is the practice in gas distribution, to install at selected points in the system gas regulators for regulating the gas pressure from a supply main to a system of supply pipes to consumers in a given territory. In such auxiliary systems the points most remote from the regulator must be supplied with a predetermined minimum gas pressure for satisfactory service. As the pressure at the points remote from the regulator is subject to wide variation between the times of minimum load and peak load in the consumer's supply system if the regulator is set to deliver sufficient pressure under peak load conditions, excessive pressures develop in the system at other times.

In the prior methods of regulation of gas flow, it has generally been the practice to rely upon the static gas pressures developed in the outlet of a pressure regulator for the purpose of maintaining satisfactory pressures in the consumer's supply system, and the regulators have been adjusted manually to meet varying load conditions. Manual adjustment is, however, unsatisfactory and expensive, and accordingly efforts have been made to effect automatic variation of the regulator outlet pressures to meet the conditions for satisfactory service, such proposed automatic regulating systems have however been complicated in nature and difficult to adjust to the varied conditions met in practice. Such prior proposed constructions have been further defective in that variations in inlet pressures which in practice are frequently wide are reflected in the outlet pressures of the regulator and cause outlet pressure variations independently of the flow and tend to cause hunting or surges of pressure in the consumer's supply system connected to the regulator outlet that are very undesirable and give poor regulation. Also because of their complicated nature, the installation costs as well as the cost of adjustments, repairs, and maintenance of the prior proposed automatic regulation have been high and their performance in service has been more or less unsatisfactory.

I have discovered by utilizing a properly restricted dynamic flow of fluid or Pitot tube action derived from the main flow to be controlled, to control a regulator, that a simple regulating system of desirable characteristics may be provided in which the stable regulation and outlet pressures substantially independent of the inlet or supply pressures may be maintained in a consumer's supply system, and in which the pressure may be automatically varied with variations in flow or demand to satisfactory pressures under all operating conditions. In applying my invention in practice, the regulating effect may further more be readily adjusted and varied to meet the varying conditions of service required in different areas, or in the same area as extensions and alterations of service are made with the growth of a community. This I accomplish by utilizing a novel principle of dynamic flow control which consists essentially in establishing controlling pressures due to dynamic flow to control the operation of a pressure regulator so that during periods of minimum flow the pressures controlling the regulator are substantially the same as in the outlet of the regulator, while as the flow increases the pressure controlling the regulator is automatically lowered substantially independently of the inlet regulator pressures in a manner to give satisfactory operating pressures throughout the system controlled by the regulator.

With my improved regulating system it is possible to provide standard regulating devices which may be installed in any consumer's gas supply system, the point of minimum pressures in the system may be determined by manometer readings and by a simple adjustment of an orifice the desired characteristic may be imparted to supply a satisfactory pressure under all conditions to the low pressure point of the system thereby insuring that all intermediate points are supplied with sufficient pressure for satisfactory service during all flow conditions throughout the day.

It is accordingly a primary object of the present invention to provide novel methods and apparatus for controlling the pressure of a fluid supply to a system of fluid distribution as the demand varies in order to maintain fluid pressures above a predetermined value at all points in the system.

Another object of the invention is to provide novel methods and apparatus for regulating fluid pressures through a pressure regulator in accordance with fluid flow so that the effect of the regulator will vary with the variations in fluid flow in the system and at the same time will be substantially independent of the variations in the fluid supply to the inlet of the regulator.

It is a still further object of the invention to provide fluid pressure regulating apparatus easy to assemble and which permits of easy, quick and accurate adjustment to meet widely variable conditions.

It is a further object of the invention to provide a pressure regulating apparatus simple in construction, reliable in operation, and which can be manufactured, sold, and maintained at relatively low cost.

With the foregoing objects in view, as well as others that will appear from the following disclosure and the scope of the appended claims reference will be had to the accompanying drawings forming a part thereof, and in which—

Figure 1 is a side elevational view partly in substantially central longitudinal section of a gas pressure regulator showing a preferred form of my invention associated therewith.

Figure 2 is a fragmental plan view, on an enlarged scale of the variable connection from the dynamic flow control system to the flow to be controlled.

Figure 3 is a vertical sectional view taken substantially on a plane represented by line 3—3 in Figure 2.

Figure 4 illustrates graphically the pressure relating effect secured with different adjustment of my improved apparatus.

Figure 5 is a sectional view of a modified form of safety valve utilized with my invention.

Referring to the drawings by reference characters in which like characters designate like parts, as shown in Figure 1, 10 designates a gas pressure regulator which may be of any well known construction and which as illustrated comprises a regulator body casting 11 of hollow formation divided by a partition wall 12 into inlet and outlet chambers. Wall 12 is provided with an opening to permit flow of gases between the regulator chambers, and detachably secured thereto by studs 13 is a valve bowl 14 which projects into the outlet chamber, and is provided with opposite, parallel plane walls 15 which are provided with oppositely positioned alined ports 16. Seated in and controlling ports 16 is a balanced valve 17. Casting 11 is preferably provided with a bay 18 for causing a sinuous course in the gas flow which upon entering bowl 14 is divided and flows in two opposite vertical streams through ports 16 into the outlet chamber. The end of bowl 14 opposite the inlet is closed, and as shown, casting 11 is provided with an apertured flange 11' for detachably receiving a closing plate by the removal of which access may be gained to the interior of valve casting 11, to permit replacement of the valve bowl 14 or servicing of the valve parts without removing the regulator body from the supply mains. A suitable strainer 19 is disposed in bowl 14 for straining the gas as it passes from inlet chamber into bowl 14.

Casting 11 at one side of the chamber and valve construction just described embodies a truncated conical extension 21 provided with a flange 22, and at its opposite side is provided with a cylindrical extension 23 which merges into bay 18 and is provided with a flange 24.

Extension of casting 11 is provided with a longitudinal channel section 25 merging into a hollow vertical extension 26 in communication with the interior of extension 21. Hollow extension 26 is provided with a laterally projecting flange 27. Detachably secured to flange 27 by means of suitable securing bolts is a flange 28 of a tubular supporting extension 29 of lower diaphragm chamber section 31. Chamber section 31 is provided with a laterally projecting flange 32 to which laterally projecting flange 33 of upper diaphragm chamber section 34 is detachably secured by means of suitable securing bolts. Clamped between flanges 32 and 33 is the margin of a flexible diaphragm 35. Upper section 34 is provided with an aperture 36 marginally defined by a flange 37 to which a flange 38 of a cover 39 is detachably secured.

Diaphragm 35 is provided with a flexible marginal portion 41 and its central portion is secured to a rigid weight supporting diaphragm pan structure 42 engaged on opposite sides by washers 43 through which extends a rod 44 adjustably secured in position by nuts 45 threadedly engaged with rod 44 and engaging opposite faces of washers 43. Removable weight members 46 are supported on central plane portion 42 of diaphragm 35. Rod 44 extends through cylindrical portion 29 and has secured thereto by washers 47 and a nut 48 the central portion of a sealing diaphragm 49 whose outer marginal portion is secured about the mouth of cylindrical portion 29 by a ring 51. The diaphragm 49 provides a gas tight connection and permits vertical reciprocation of rod 44.

Pivotally secured to the lower end of rod 44 at 52 is the upper end of a link 53 which at its inner end is pivotally secured at 54 to one end of a lever 55 which extends through channel 25 into the outlet chamber where it is pivotally secured adjacent the opposite end thereof at 56 within a bifurcation of a standard 57 integral with bowl 14 and projecting upwardly therefrom. The opposite end of lever 55 adjacent pivotal connection 56 is pivotally secured at 58 between the outer ends of links 59 whose inner ends are pivotally secured at 61 to valve 15.

In the usual operation of pressure regulators of the character described the chamber defined by section 31 and diaphragm 35 is subjected to a pressure equal to that in the outlet chamber through a communicating connection and the weight 46 is such that it will overcome the pressure exerted on the bottom of diaphragm 35 when the pressure in the outlet chamber falls below a predetermined pressure whereby valve 15 is opened an amount corresponding to the fall of static pressure in the outlet chamber for restoring the pressure and when the pressure in the outlet chamber equals or exceeds the predetermined pressure, diaphragm 35 is forced upwardly against the action of weight 46 to close valve 15 through rod 44 link 53 and lever 55. In other words as is well understood by those skilled in this art the regulator maintains a substantially constant pressure in the outlet chamber unless the pressure in the inlet chamber should fall below the desired predetermined outlet pressure.

While pressure regulators of the character described maintain a constant outlet pressure which is satisfactory when the consumption of gas is substantially uniform it is important for satisfactory regulation of a consumer's supply system where the demand varies widely that the outlet pressure be raised when there is an increased demand resulting in a substantially increased flow and in accordance with my invention, instead of connecting the lower side of the diaphragm directly to the outlet of the regulator so that it will be responsive to the static pressure in the outlet, a novel dynamic flow connection is utilized to control the gas pressure beneath the diaphragm.

My dynamic flow control assembly comprises a Venturi section between the regulator outlet and the consumer's supply system which includes a cylindrical member 62 the opposite ends of which are threaded into flange members 63 one of which is detachably secured to flange 22 of casting 11. Disposed within member 62 are truncated conical members 64 whose outer larger ends are welded to the inner surface of member 62 and whose inner smaller ends are welded to the opposite faces of a ring 65 (Figure 3) which is provided with a vertically disposed aperture 66. Threadedly engaged in an aperture 67 in member 62 in axial alinement with aperture 66 is a plug 68. Plug 68 is provided with a threaded recess 69 in which is mounted the threaded lower end of a cylinder 71. The lower end of cylinder 71 is spaced from the bottom of recess 69 and a packing 72 is disposed in recess 69 below the threaded end of cylinder 71. The upper end of cylinder 71 is threadedly engaged with the lower end of a coupling 73 the upper end of which is in threaded engagement with an inwardly extending apertured extension 74 of a bearing member 75 provided with a threaded recess 76 in the bottom of which is positioned a packing 77 retained therein by a threaded plug 78 engaged in recess 76. Extending vertically vertically through aperture 66, and aperture 79 in plug 68, cylinder 71, coupling 73, the aperture in extension 74 and an aperture 80 in plug 78 and rotatable therein is a Pitot tube 81 provided with gas flow openings 82, and the lower end of which projects within ring 65 and is beveled at substantially a 45° angle as indicated at 83 for a purpose later described. At its upper end tube 81 is closed and is secured at 84 to one end of an actuating arm 85. The opposite end of arm 85 is provided with a bore 86 in which is slidably mounted a rod 87 the outer end of which is secured to a knob 88. A helical spring 89 surrounds rod 87 beneath arm 85 and normally urges knob 88 into contact with the outer surface of arm 85 and the inner end of rod 87 in any one of a plurality of apertures 91 (Figure 2) formed in a sector plate 92 mounted on an extension 93 of bearing member 75.

Coupling 73 is provided with a lateral branch 94 in which is threaded one end of a pipe 95 whose opposite end is engaged with a T-connector 96, a union 97 being interposed in pipe 95. Coupling 96 is connected to one end of a nipple 98 whose opposite end is threaded into a boss 99 on the bottom of diaphragm chamber section 31. Coupling 96 has threadedly secured thereto one end of a nipple 101 whose opposite end is secured by suitable pipe and elbow connections 102 to a J-fitting 103 of a substantially rectangular shaped pipe construction 104 providing two flow paths for gases and which is in communication with the outlet chamber of the regulator through suitable elbow and pipe connections 105.

Connected in one side branch of construction 104 is an adjustable orifice construction or needle valve 106 and connected in the opposite side branch of construction 104 is a safety valve 107 of any suitable construction, as for example is disclosed in U. S. patent to William J. Keenan and John C. Duncan 1,497,726, June 17, 1924, comprising a casing 108 in which is disposed a vertically movable ribbed dead weight member 109 to the inner end of which is secured a yieldable diaphragm 111 for engagement with a seat 112 formed in a flanged thimble in the inner end of casing 108 and in communication with tubular construction 104, ribbed member 109 being of a graduated weight such that diaphragm 111 will be maintained in fluid sealing engagement with the seat in thimble 112 until acted upon by a pressure sufficient to unseat the valve.

As indicated in Figure 1 the combined regulator and dynamic flow control assembly is detachably connected by means of stud bolts 114 to the adjacent flanges 115 of flow control valves 116 the construction of which is well understood and whose opposite flanges are detachably secured in the gas supply line.

Operation of the construction so far described is initiated by first opening valve 116 slowly at the inlet of the regulator and the pressure builds up in the regulator diaphragm chamber through the dynamic flow control connections until the diaphragm is raised until the regulator is closed. The inlet and outlet valve 116 may then be opened wide and the system is in operation. So long as the demand in the consumer's supply system is low, the pressure at the point of connection 105 and at the end 83 of the Pitot tube 81 at Venturi section 65 will be substantially equal, no flow will occur through the dynamic flow control connections and the pressure beneath the regulator diaphragm established through the dynamic flow connection will be substantially equal to the outlet pressure of the regulator. As the demand inlet creases the increased flow resulting through the Venturi section causes a pressure difference between the point of connection 105 and the section 65 which will vary with the rate of flow from the regulator outlet into the consumer's supply system. At the same time the flow past the end 83 of Pitot tube 81 will cause a further pressure difference due to the well known Pitot effect which will be positive or negative depending upon whether the inclined end 83 of tube 81 faces downstream or upstream. A fluid flow will accordingly be established from the point of connection 105 in the regulator outlet through the needle valve 106, the pipe fittings and connections 103, 102, 96 and 95 and tube 81 into Venturi section 65. As a result of the restriction of this flow due to the setting of needle valve or variable orifice 106, a pressure intermediate the regulator outlet pressure and the pressure at the end 83 of the tube 81 will be established at connection 96 and in the diaphragm chamber depending upon the flow through the regulator and the restriction of flow by needle valve 106. As a result, the flow of gas through the dynamic flow control connections will tend to reduce the pressure in the diaphragm chamber causing lowering of the diaphragm and opening the balanced valve 15 so that the pressure in the outlet of the regulator will increase to the point where the pressures set up in the diaphragm chamber by the dynamic flow between connection 105 and tube 81 through the variable orifice or needle valve 106 will again balance the weighted diaphragm. A new balance will then be established with valve 15 in a new position and a definitely established higher outlet pressure for the particular flow will be maintained until the flow again changes when the pressures set up in the regulator diaphragm chamber by operation of the dynamic flow connection will again reach a balance at which a new outlet pressure will be established. With a given setting of the orifice or needle valve 106 a definite relation of outlet pressure to flow is accordingly established which will rise and fall with the flow.

The effect of various settings of valve 106 with the particular construction illustrated is shown in Figure 4, in which the rate of flow in cubic feet per hour has been plotted against the outlet pressure of regulator in inches of water for different openings of the needle valve 106 for a particular assembly. The curve A was secured with the needle valve open one half turn, curve B was secured with the needle valve open one turn and curve C was secured with the needle valve open two turns. It will be observed that as the rate of flow increases a marked increase of regulator outlet pressure was secured, in all three settings.

With the needle valve completely open the regulation curve is substantially flat showing substantially no increase in outlet pressure with the increase of flow, and with the needle valve completely closed the system becomes unstable due to the fact that as the flow increases, a suction is exerted on end 83 of tube 81 which results in a lowering of pressure in the diaphragm chamber until the regulator is open wide and ceases to function. To guard against development of excessive pressure in the consumer's supply system due to improper adjustment or inadvertent clogging of needle valve 106, safety valve 107 is connected in a by-pass around the needle valve, and is set to open when the pressure difference between the regulator outlet and the diaphragm chamber exceeds a predetermined value permitting the gas to flow directly from the regulator outlet into the diaphragm chamber causing the regulator to close and to reduce the pressure in the system to a safe value.

It will accordingly be seen that after the regulator is installed by proper observations at the low pressure point in the system and adjustment of valve 106 desirable and satisfactory increases of pressure may be secured to give a predetermined minimum pressure under maximum demand conditions at the low pressure point in the system.

In addition to the adjustment effected by setting valve 106, in the form of invention disclosed the regulating effect may be further varied by adjusting the position of tube 81 to get the variations in pressure due to variations of the Pitot effect from maximum positive to maximum negative effect in combination with the static pressure differences due to the action of the Venturi flow section. This adjustment is, however, not essential in practice. While three different fixed settings or positions of tube 82 are indicated, it will be obvious that any number of settings may be provided between the up and down stream positions. Tube 81 is adjusted to any desired position through rotation thereof by means of arm 85 which is moved by pulling upwards on knob 88 against the action of spring 89 for withdrawing rod 87 from the aperture in which it is seated.

While the deadweight safety valve 107 above set forth is well adapted for use in the construction disclosed, there is a possibility of this type of valve sticking and consequently not opening when needed in operation and accordingly a modified form of valve is disclosed in Figure 5 which is not subject to sticking and is accurate and reliable. As shown this valve comprises a casing 120 provided with oppositely extending alined threaded ports 121 for connection with threaded ends of pipe sections of the lower horizontally disposed branch of construction 104. Casing 120 is provided with an integral centrally disposed dividing wall 122 the lower end of which terminates in close proximity to bottom of casing 120. A mercury seal 123 is provided which rests in the bottom of casing 120 and normally closes the space between the inner end of plate 122 and casing 120 thus normally closing communication between the outlet chamber and diaphragm chamber. In operation of this form of safety valve, a sufficient quantity of mercury may be placed in casing 120 to maintain a seal against a predetermined pressure difference. When a pressure difference in excess of the predetermined valve between the regulator outlet and the diaphragm chamber develops, the mercury seal will be broken and communication established between the outlet chamber and diaphragm chamber.

It will accordingly be seen that a dynamic pressure regulating apparatus and system is provided that is automatic in operation, varies the regulation outlet pressures in accordance with flow variations independently of inlet pressure variations and in which the regulating characteristics may be adjusted in ready and simple manner.

While I have disclosed a specific form of regulator in which the diaphragm chamber is sealed from direct connection with the regulator outlet pressure, it is to be understood that my invention is not limited in its adaptability to such a regulator but is adapted for use with various other forms of regulators.

Having set forth specific embodiments of my invention it is to be understood that the invention is not limited thereto but that the scope of my invention is defined by the terms of the appended claims. Accordingly what is claimed as new and desired to be secured by Letters Patent is:

1. In combination with a diaphragm operated pressure regulator embodying an operating diaphragm chamber; means connected to the outlet of said regulator to establish an area of pressure lower than the pressure in the outlet of said regulator by an amount dependent on the flow of fluid through said regulator outlet; a bypass fluid connection between the outlet of said reglator and said area; flow restricting means connected in said bypass connection; and a connection from said bypass to said diaphragm chamber providing a non-closable passage between said chamber and said area.

2. In combination with a fluid pressure regulator embodying fluid responsive operating means, a Venturi section connected to the outlet of said regulator for establishing pressure differences dependent on the flow of fluid through said regulator outlet; a bypass fluid connection between the outlet of said regulator and the minimum area of said Venturi section; flow restricting means connected in said bypass connection; and a fluid connection to said first mentioned means from a point in said bypass connection providing a passage of fixed minimum area between said first mentioned means and said Venturi section.

3. In combination with a diaphragm operated pressure regulator embodying an operating diaphragm chamber, means for establishing a reduced pressure area on the low pressure side of said regulator, a fluid connection of fixed minimum area between said area of reduced pressure and said diaphragm chamber, a fluid connection between the low pressure side of said regulator and said chamber, and a restriction in said last named connection.

4. In a pressure boosting system, a pressure regulator having an inlet and outlet chamber and embodying fluid responsive operating means; means for establishing a reduced pressure area adjacent said outlet chamber; a permanently open fluid connection between said reduced pressure area and said operating means; a fluid connection between said outlet chamber and said operating means; a flow restriction in said last named connection; a second fluid connection between said outlet chamber and said operating means; and normally closed means in said second connection adapted to open when the outlet pressure of said regulator exceeds a predetermined amount to prevent the development of unsafe pressures on the outlet side of said regulator.

5. In a pressure boosting system, a pressure regulator embodying an operating chamber; a Venturi section connected to the low pressure side of said regulator; a permanently open fluid connection between the high velocity area of said venturi and said chamber; a fluid connection between the outlet side of said regulator and said chamber; a variable flow restriction in said last named connection; a second fluid connection between the outlet side of said regulator and said chamber; and normally closed means in said second connection adapted to open when the pressure in the outlet side of said regulator exceeds a predetermined safe value.

6. In combination with a fluid pressure regulator embodying fluid responsive operating means, and having an inlet and outlet chamber at a point of non-turbulent flow; a Venturi section connected to said outlet chamber; and a fluid connection between said fluid responsive operating means and the high velocity portion of said Venturi section including an adjustable Pitot tube.

7. In combination with a fluid pressure regulator embodying a fluid responsive operating means, and having an inlet and outlet chamber; a low pressure conduit connected to said outlet chamber; a Venturi section disposed in said low pressure conduit at a point of stream line flow; a fluid connection between said fluid responsive operating means and the reduced area of said Venturi section embodying an adjustable Pitot tube; and a connection between said fluid responsive operating means and said outlet chamber embodying a variable restriction.

8. In combination with a fluid regulator having inlet and outlet chambers and embodying fluid responsive operating means; means for establishing an area of reduced pressure connected to the outlet chamber of said regulator; a fluid connection between said area of reduced pressure and said fluid responsive operating means; means for varying the effect of flow through said area of reduced pressure on said connection; a fluid connection comprising a flow restriction between the outlet chamber of said regulator and said fluid responsive operating means; and a second fluid connection between the outlet chamber of said regulator and said fluid responsive operating means comprising a normally closed device adapted to open and permit free flow of fluid between said outlet chamber and said fluid pressure responsive operating means when the pressure in said outlet chamber exceeds a predetermined maximum amount.

9. In a fluid pressure controlling system, a high pressure conduit, a low pressure conduit, a pressure regulator interposed between said conduits; a Venturi section disposed in said low pressure conduit adjacent the outlet of said regulator and at a point of stream line flow; an adjustable Pitot tube communicating with said Venturi section; means for varying the position of said tube to vary the effect of flow through said Venturi section thereon; and a fluid connection between said tube and said regulator.

10. In combination with a fluid regulator having inlet and outlet chambers and embodying fluid responsive operating means; a fluid connection between said outlet chamber and said fluid responsive operating means; and a normally closed device disposed in said connection adapted to open and permit free flow of fluid from said outlet chamber to said fluid pressure responsive operating means when the pressure in said outlet chamber exceeds a maximum amount.

11. In combination with a fluid regulator having inlet and outlet chambers and embodying fluid responsive operating means; a fluid connection between said outlet chamber and said fluid responsive operating means; a second fluid connection between said outlet chamber and said fluid responsive operating means; and a normally closed device disposed in said second connection adapted to open and permit free flow of fluid from said outlet chamber to said fluid pressure responsive operating means when the pressure in said outlet chamber exceeds a predetermined amount.

12. The method of controlling fluid flow between a high pressure conduit and a low pressure conduit to increase the pressure in the low pressure conduit as the flow therein increases, comprising establishing areas of high and low pressure between which areas the pressure and velocity differences vary with the rate of flow in the low pressure conduit, utilizing a Pitot tube action due to flow past said low pressure area to increase the pressure at said high pressure area during high flows substantially above the pressure at the high pressure area during low flows, and modifying the effect of said Pitot tube action in accordance with the pressure variations at said high pressure area in such manner as to counteract the effect of the Pitot tube action increasingly as the pressures and flows in the low pressure conduit increase.

13. The method of controlling flow between a high pressure conduit and a low pressure conduit to increase the pressure in said low pressure conduit with increases of flow therein between predetermined limits, comprising the steps of establishing areas of high and low pressure between which the fluid pressure and velocity differences vary with the rate of flow in the low pressure conduit, utilizing the Pitot tube action due to fluid flow past said low pressure area to increase the pressure at said high pressure area during high flows substantially above the pressure at said high pressure area during low flows, modifying the effect of said Pitot tube action in accordance with the pressure variations at said high pressure area in such manner as to counteract the effect of said Pitot tube action increasingly as the pressures and flows in the low pressure conduit increase and counteracting the effect of said Pitot tube action completely in event predetermined maximum pressure is reached in said low pressure conduit.

14. The method of controlling flow between a high pressure conduit and a low pressure conduit to increase the pressure in the low pressure conduit as the flow therein increases comprising establishing areas of high and low pressures between which the fluid pressures and velocity differences vary with the rate of flow in the low pressure conduit, utilizing a Pitot tube action of non-turbulent flow past the low pressure area to increase the pressure at said high pressure area during high flows substantially above the pressure at said high pressure area during low flows, and modifying the effect of said Pitot tube action in accordance with the difference in pressure between said high pressure area and said low pressure area.

15. In combination with a fluid regulator having inlet and outlet chambers and embodying fluid responsive operating means, means in communication with said outlet chamber for producing an area of low pressure, a fluid connection directly connecting said fluid responsive operating means and said means for producing an area of low pressure whereby said pressure is effective only upon said fluid responsive operating means, a restricted conduit connecting said fluid responsive operating means and said outlet chamber, and means for transmitting to said fluid responsive operating means the pressure in said outlet chamber, said latter means being inoperative until the pressure in said outlet chamber reaches a predetermined maximum.

ALLEN D. MacLEAN.